1472X
S. Randall.
Magazine Stove.
Patented Mar. 12, 1811.
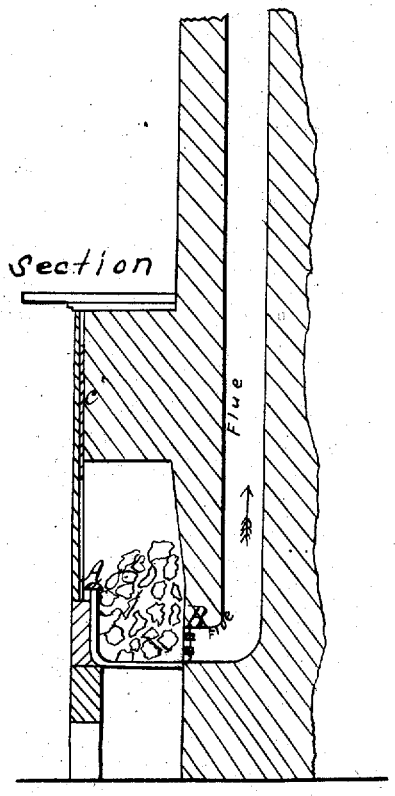
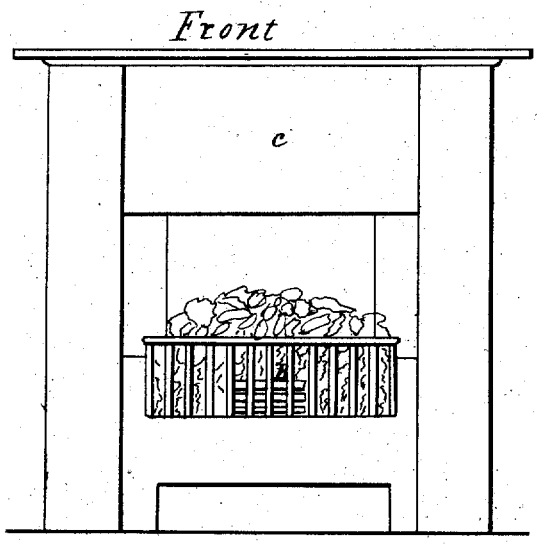

Samuel Randall. 1472X

Letters Patent

The schedule referred to in these Letters Patent and making part of the same containing a description in the words of the said Samuel Randall himself of his [illegible] air draught An air Grate or Grate through which the air must pass before it can ascend in the chimney pipe or flue is fixed under the coal or aliment of the fire or in the back or side of whatever contains the coal &c. and adjacent to the bottom of it so that no air can pass up in the chimney pipe or flue without first ascending perpendicularly or obliquely into and through the coal or aliment of the fire that is the fire itself The force of the draught may be governed by a movable plate of cast or sheet iron fixed above the fire or any other plan that will supply or partially supply the chimney pipe or flue with unrarified air. This principle of the draught may be applied to any fire Place Stove or furnace Witnesses
Eben M [illegible]
George Sanders Samuel Randall 170 [illegible]